(12) United States Patent
Nemoto

(10) Patent No.: US 8,898,570 B2
(45) Date of Patent: Nov. 25, 2014

(54) JOB ADMINISTRATION APPARATUS, JOB ADMINISTRATION SYSTEM AND COMPUTER-READABLE STORAGE MEDIUM CONVERTING PORTION OF INFORMATION OF JOB DATA INTO NON-RECOGNIZABLE FORMAT FOR DISPLAY

(75) Inventor: Masaya Nemoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 2497 days.

(21) Appl. No.: 11/135,526

(22) Filed: May 24, 2005

(65) Prior Publication Data
US 2005/0264839 A1    Dec. 1, 2005

(30) Foreign Application Priority Data

May 28, 2004    (JP) .................................. 2004-159407
May 12, 2005    (JP) .................................. 2005-140183

(51) Int. Cl.
G06F 3/00    (2006.01)
G06F 21/60    (2013.01)

(52) U.S. Cl.
CPC .................................. *G06F 21/608* (2013.01)
USPC ........................................ 715/741; 715/743

(58) Field of Classification Search
CPC ...................................................... G06F 3/00
USPC ................................................ 715/741–743
See application file for complete search history.

(56) References Cited

U.S. PATENT DOCUMENTS

| | | | | |
|---|---|---|---|---|
| 4,881,179 A | * | 11/1989 | Vincent | 358/1.14 |
| 5,745,714 A | * | 4/1998 | Glass et al. | 715/788 |
| 5,877,746 A | * | 3/1999 | Parks et al. | 345/156 |
| 6,351,815 B1 | * | 2/2002 | Adams | 726/32 |
| 6,424,429 B1 | * | 7/2002 | Takahashi et al. | 358/1.16 |
| 6,762,853 B1 | * | 7/2004 | Takagi et al. | 358/1.15 |
| 6,859,805 B1 | * | 2/2005 | Rogers et al. | 1/1 |
| 6,943,812 B1 | * | 9/2005 | Yoda et al. | 715/741 |
| 7,123,371 B1 | * | 10/2006 | Yoda et al. | 358/1.15 |
| 7,167,919 B2 | * | 1/2007 | Iwamoto et al. | 709/229 |
| 2001/0048823 A1 | * | 12/2001 | Nomura et al. | 399/80 |
| 2002/0041391 A1 | * | 4/2002 | Bannai | 358/1.15 |
| 2002/0044301 A1 | * | 4/2002 | Kitazawa | 358/1.16 |
| 2002/0118222 A1 | * | 8/2002 | Fogarty | 345/741 |
| 2004/0131377 A1 | * | 7/2004 | Bardolatzy et al. | 399/79 |
| 2005/0264839 A1 | * | 12/2005 | Nemoto | 358/1.13 |

FOREIGN PATENT DOCUMENTS

| | | |
|---|---|---|
| JP | 2001-101169 | 4/2001 |
| JP | 2002-298122 | 10/2002 |
| JP | 2004-13495 A | 1/2004 |
| JP | 2004-112455 A | 4/2004 |

* cited by examiner

*Primary Examiner* — Doon Chow
*Assistant Examiner* — Le Nguyen
(74) *Attorney, Agent, or Firm* — Dickstein Shapiro LLP

(57) ABSTRACT

A job administration apparatus carries out administration of job data based on an execution request for a predetermined job with respect to document data, and includes a display request receiving part to receive a display request for the job data, and a job data providing part to acquire the job data depending on the display request and to display the job data after a conversion by converting at least a portion of information of the job data into a non-recognizable format that is non-recognizable by a user.

10 Claims, 17 Drawing Sheets

| USER NAME | DOCUMENT NAME | PRINT DATE & TIME | |
|---|---|---|---|
| * * * * * * | * * * * * * | 2004/03/14 12:10:09 | ~20a |
| B | DOCUMENT B | 2004/03/14 12:13:00 | ~20b |
| | | | |
| | | | |
| | | | |

FIG.3

| USER NAME | DOCUMENT NAME | PRINT DATE & TIME | |
|---|---|---|---|
| * * * * * * | * * * * * * | 2004/03/14 12:10:09 | ~20a |
| B | DOCUMENT B | 2004/03/14 12:13:00 | ~20b |
|  |  |  | |
|  |  |  | |
|  |  |  | |

FIG.5

| USER NAME | FAX NO. | FAX TRANSMISSION DATE & TIME | |
|---|---|---|---|
| * * * * * * | * * * * * * * | 2004/05/15 12:10:09 | ~21a |
| B | 03-1234-5678 | 2004/05/15 12:13:00 | ~21b |
| | | | |
| | | | |
| | | | |

FIG.7

| USER NAME | DOCUMENT NAME | PRINT DATE & TIME | |
|---|---|---|---|
| A | DOCUMENT A | 2004/03/14 12:10:09 | ~20a |
| B | DOCUMENT B | 2004/03/14 12:13:00 | ~20b |
| | | | |
| | | | |
| | | | |

FIG.8

| USER NAME | DOCUMENT NAME | PRINT DATE & TIME | |
|---|---|---|---|
| A | * * * * * * | 2004/03/14 12:10:09 | ~20a |
| B | * * * * * * | 2004/03/14 12:13:00 | ~20b |
| | | | |
| | | | |
| | | | |

FIG.9

| USER NAME | DOCUMENT NAME | PRINT DATE & TIME | |
|---|---|---|---|
| * * * | * * * * * * | 2004/03/14 12:10:09 | ~20a |
| * * * | * * * * * * | 2004/03/14 12:13:00 | ~20b |
| | | | |
| | | | |
| | | | |

FIG.11

| USER NAME | FAX NO. | FAX TRANSMISSION DATE & TIME | |
|---|---|---|---|
| A | 03-1234-0987 | 2004/05/15 12:10:09 | ~21a |
| B | 03-1234-5678 | 2004/05/15 12:13:00 | ~21b |
|  |  |  | |
|  |  |  | |
|  |  |  | |

FIG.12

| USER NAME | FAX NO. | FAX TRANSMISSION DATE & TIME | |
|---|---|---|---|
| A | * * * * * * | 2004/05/15 12:10:09 | ~21a |
| B | * * * * * * | 2004/05/15 12:13:00 | ~21b |
|  |  |  | |
|  |  |  | |
|  |  |  | |

FIG.13

| USER NAME | FAX NO. | FAX TRANSMISSION DATE & TIME | |
|---|---|---|---|
| * * * | * * * * * * | 2004/05/15 12:10:09 | ~21a |
| * * * | * * * * * * | 2004/05/15 12:13:00 | ~21b |
|  |  |  | |
|  |  |  | |
|  |  |  | |

FIG.21

| AUTHORITY | OWN JOB | | ALL JOBS (WITH MASKING) | | ALL JOBS (WITHOUT MASKING) 1021 | | | |
|---|---|---|---|---|---|---|---|---|
| | | | | | COMPLETED JOB | | WAITING JOB | |
| | COMPLETED JOB | WAITING JOB | COMPLETED JOB | WAITING JOB | MASK DOCUMENT NAME | NO MASKING | MASK DOCUMENT NAME | NO MASKING |
| GENERAL USER | ○ | ○ | ○ | ○ | × | × | × | × |
| ADMINISTRATOR | ○ | ○ | ○ | ○ | ○ | ○ | ○ | ○ |

JOB ADMINISTRATION APPARATUS, JOB ADMINISTRATION SYSTEM AND COMPUTER-READABLE STORAGE MEDIUM CONVERTING PORTION OF INFORMATION OF JOB DATA INTO NON-RECOGNIZABLE FORMAT FOR DISPLAY

BACKGROUND OF THE INVENTION

1. Field of the Invention

The present invention generally relates to, and more particularly to job administration apparatuses, job administration systems and computer-readable storage media, and more particularly to a job administration apparatus and a job administration system that employ electronic document administration techniques and security techniques for electronic documents such as printing documents and facsimile transmission documents, and to a computer-readable storage medium that stores a program for causing a computer to function as such a job administration apparatus and job administration system.

2. Description of the Related Art

Recent technological developments have enabled the size and cost of computers to be further reduced and the performance of the computers to be further improved. Consequently, computers are utilized in various fields. A user can create various documents using the computer, such as a personal computer and a work station, store the created documents in the computer, and print the created document if necessary. In addition, in the recent computers, it is possible to send the created document by a facsimile transmission without having to scan the created document.

In addition, networking of computer systems have become common, thereby making it extremely easy to carry out a process such as making an access from one computer A to another computer B via a network and making a reference to data stored in the computer B.

In view of such technical background, a system administrator (or system manager) or a system operator must take into consideration security problems, such as an unauthorized user participating in a network operation and referring to data via the network.

For example, a Japanese Laid-Open Patent Application No. 2001-101169 proposes a document administration system for simply and positively detecting a status of an electronic document and efficiently carrying out a masking process with respect to the electronic document.

A Japanese Laid-Open Patent Application No. 2002-298122 proposes an information disclosure system that sets an information disclosing region and an information non-disclosing region depending on a data inspection right level of a system user.

However, in the network system, not only may an unauthorized user unexpectedly participate in the network operation and directly refer to a file (electronic data) that is stored in the computer, but also indirectly acquire the information of the file from an operation log or the like of the computer.

For example, when carrying out a printing using a printer, data to be printed (a print job) is stored in a queue of a printer server, and it is possible to know the user who carried out the printing and the data printed by the user by referring to the print job.

On the other and, when carrying out a facsimile transmission, a facsimile transmission job is stored in the queue, and it is possible to know the user who carried out the facsimile transmission and a destination to which the facsimile transmission was made by referring to the facsimile transmission job. Hence, there is a possibility of the destination facsimile number leaking to an unauthorized user. From the point of view of information management, such problems must be dealt with case in computer systems that treat customer data and data peculiar to the operator.

SUMMARY OF THE INVENTION

Accordingly, it is a general object of the present invention to provide a novel and useful job administration apparatus, job administration system and computer-readable storage medium, in which the problems described above are suppressed.

Another and more specific object of the present invention is to provide a job administration apparatus, a job administration system and a computer-readable storage medium, which take into consideration the security with respect to document data, such as print documents and facsimile documents.

Still another and more specific object of the present invention is to provide a job administration apparatus for carrying out administration of job data based on an execution request for a predetermined job with respect to document data, comprising a display request receiving part configured to receive a display request for the job data; and a job data providing part configured to acquire the job data depending on the display request, and to display the job data after a conversion by converting at least a portion of information of the job data into a non-recognizable format that is non-recognizable by a user. According to the job administration apparatus of the present invention, it is possible to take into consideration the security with respect to document data, such as print documents and facsimile documents.

A further object of the present invention is to provide a job administration system comprising a job request apparatus configured to make an execution request for a predetermined job with respect to document data; and a job administration apparatus configured to carry out administration of job data based on the execution request for the predetermined job, where the job administration apparatus comprises a display request receiving part configured to receive a display request for the job data; and a job data providing part configured to acquire the job data depending on the display request, and to display the job data after a conversion by converting at least a portion of information of the job data into a non-recognizable format that is non-recognizable by a user. According to the job administration system of the present invention, it is possible to take into consideration the security with respect to document data, such as print documents and facsimile documents.

Another object of the present invention is to provide a computer-readable storage medium which stores a program for causing a computer to carry out administration of job data based on an execution request for a predetermined job with respect to document data, where the program comprises a display request receiving procedure causing the computer to receive a display request for the job data; and a job data providing procedure causing the computer to acquire the job data depending on the display request, and to display the job data after a conversion by converting at least a portion of information of the job data into a non-recognizable format that is non-recognizable by a user. According to the computer-readable storage medium of the present invention, it is possible to take into consideration the security with respect to document data, such as print documents and facsimile documents.

Other objects and further features of the present invention will be apparent from the following detailed description when read in conjunction with the accompanying drawings.

BRIEF DESCRIPTION OF THE DRAWINGS

FIG. 3 is a diagram showing a screen display of a print job list in the electronic document administration client;

FIG. 5 is a diagram showing a screen display of a facsimile transmission job list in the electronic document administration client;

FIG. 7 is a diagram showing a screen display of a print job list, without masking, in the electronic document administration GUI;

FIG. 8 is a diagram showing a screen display of a print job list, with masking, in the electronic document administration GUI;

FIG. 9 is a diagram showing a screen display of a print job list, with masking, in the electronic document administration GUI;

FIG. 11 is a diagram showing a screen display of a facsimile transmission job list, without masking, in the electronic document administration GUI;

FIG. 12 is a diagram showing a screen display of a facsimile transmission job list, with masking, in the electronic document administration GUI;

FIG. 13 is a diagram showing a screen display of a facsimile transmission job list, with masking, in the electronic document administration GUI;

FIG. 21 is a diagram showing a structure of a mask type judging table.

DESCRIPTION OF THE PREFERRED EMBODIMENTS

Figure 1:
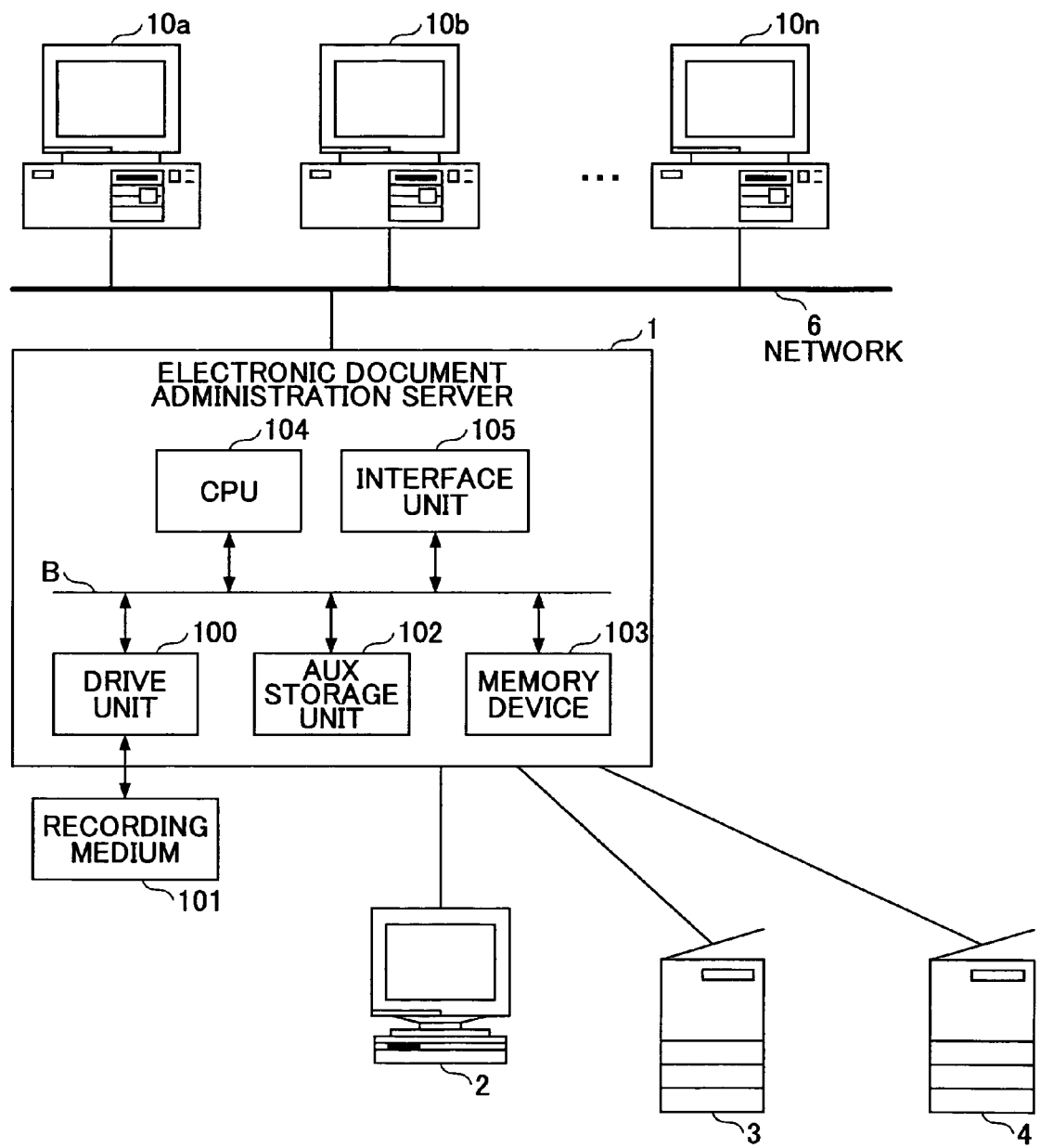
FIG. 1 is a diagram showing a structure of an electronic document administration system as one embodiment of the present invention.

A description will be given of embodiments of the present invention, by referring to the drawings. FIG. 1 is a diagram showing a structure of an electronic document administration (or management) system as one embodiment of the present invention.

The electronic document administration system includes an electronic document administration server 1, an electronic document administration GUI (Graphic User Interface) 2, a printer 3 and a facsimile apparatus 4 that are connected to the electronic document administration server 1, and electronic document administration clients 10a, 10b, . . . , 10n that are connected to the electronic document administration server 1 via a network 6.

The electronic document administration server 1 includes a drive unit 100, an auxiliary storage unit 102, a memory device 103, a CPU 104 and an interface unit 105 that are mutually connected via a bus B.

One or more programs that realize processes in the electronic document administration server 1 are stored in a recording medium 101 such as a CD-ROM. When the recording medium 101 recorded with the program is set in the drive unit 100, the program is installed from the recording medium 101 to the auxiliary storage unit 102 via the drive unit 100.

The auxiliary storage unit 102 stores the installed program, and the necessary files and data and the like. The memory device 103 stores the program read from the auxiliary storage unit 102 in response to a program start instruction. The CPU 104 executes functions related to the electronic document administration server 1 according to the program stored in the memory device 103. The interface unit 105 forms an interface for connecting the electronic document administration server 1 to the network 6.

Figure 2:
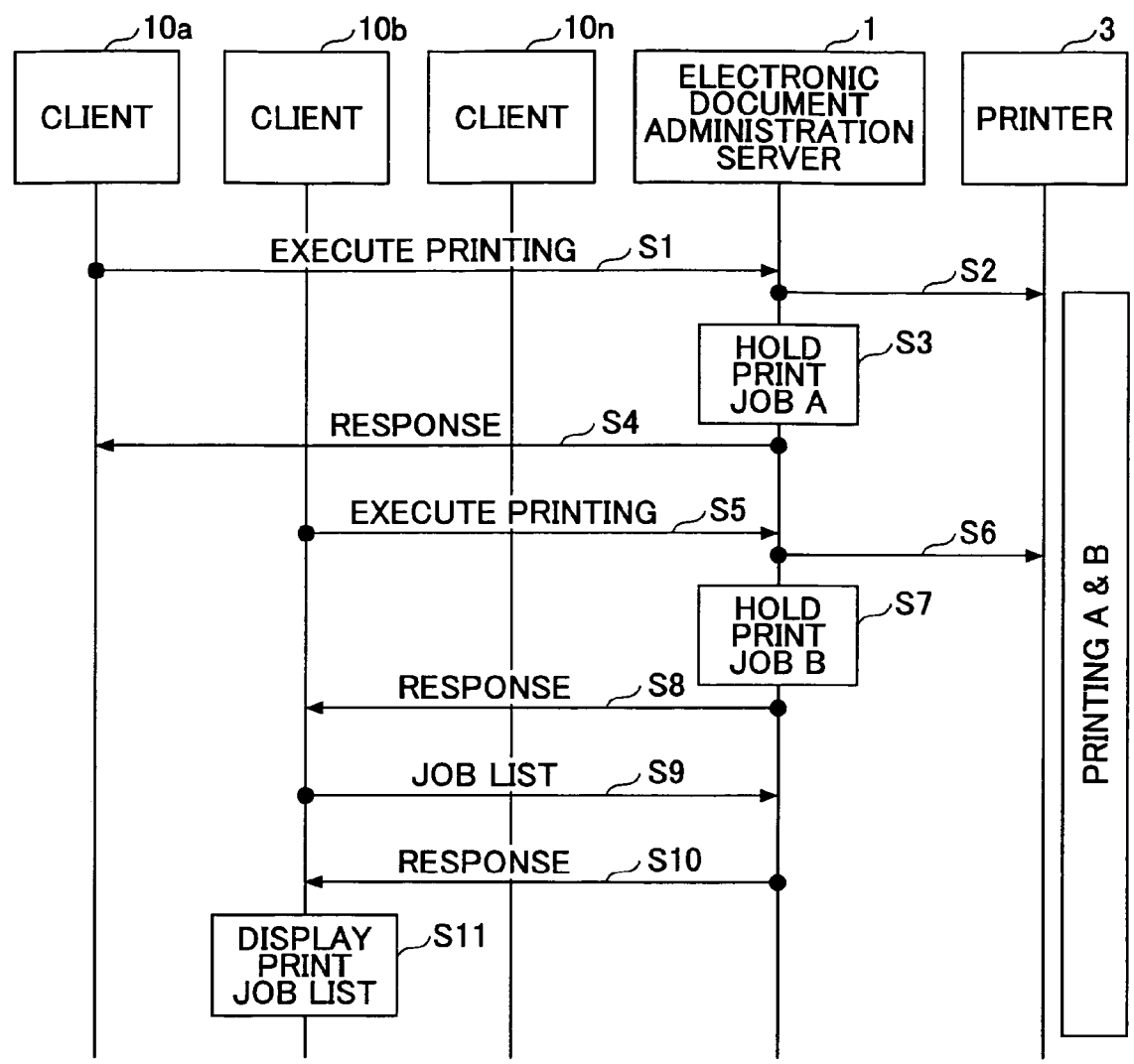
FIG. 2 is a diagram showing a print job acquisition sequence from an electronic document administration client.

FIG. 2 is a diagram showing a print job acquisition sequence from the electronic document administration client.

For example, the electronic document administration client 10a instructs execution of a document printing with respect to the electronic document administration server 1, as a print execute instruction from the client (step S1). The electronic document administration server 1 that receives the print execute instruction instructs execution of the document printing with respect to the printer 3 (step S2), holds a print job in a format including a user name and a document name (step S3), and sends a response to the electronic document administration client 10a (step S4). For example, the print job is held in the format including a user name "A" and a document name "A document".

In addition, when printing the document of the electronic document administration client 10b, the electronic document administration client 10b instructs execution of a document printing with respect to the electronic document administration server 1, as a print execute instruction from the client (step S5). The electronic document administration server 1 that receives the print execute instruction instructs execution of the document printing with respect to the printer 3 (step S6), holds a print job in the format including the user name and the document name (step S7), and sends a response to the electronic document administration client 10b (step S8). For example, the print job is held in the format including a user name "B" and a document name "B document".

In this case, when the electronic document administration client 10b requests acquisition of a print job list (step S9), a print job list shown in FIG. 3 is displayed and output to a screen of the electronic document administration client 10b (steps S10 and S11). FIG. 3 is a diagram showing a screen display of the print job list in the electronic document administration client 10b.

As shown in FIG. 3, since a print job 20a is instructed by the electronic document administration client 10a, the user name "A" and the document name "A document", that is, a portion of the information of the print job 20a, is converted (masked) into a format non-recognizable by the user. On the other hand, since a print job 20b is instructed by the electronic document administration client 10b itself, details of the print job 20b are displayed in the print job list. The print job list also includes a print time indicating a date and time when the print job is executed.

With respect to the user who executes the printing, the print jobs of the other users are masked, and in the above described case, the user names of the other users and the document names of the documents that are being printed by the other users are masked. For this reason, it is possible to provide security with respect to the print documents of the other users.

In addition, because all of the print jobs are displayed in the list (or table) format, it is possible to know the order (or position) of the user's own print job in relation to all of the print jobs.

Figure 4:
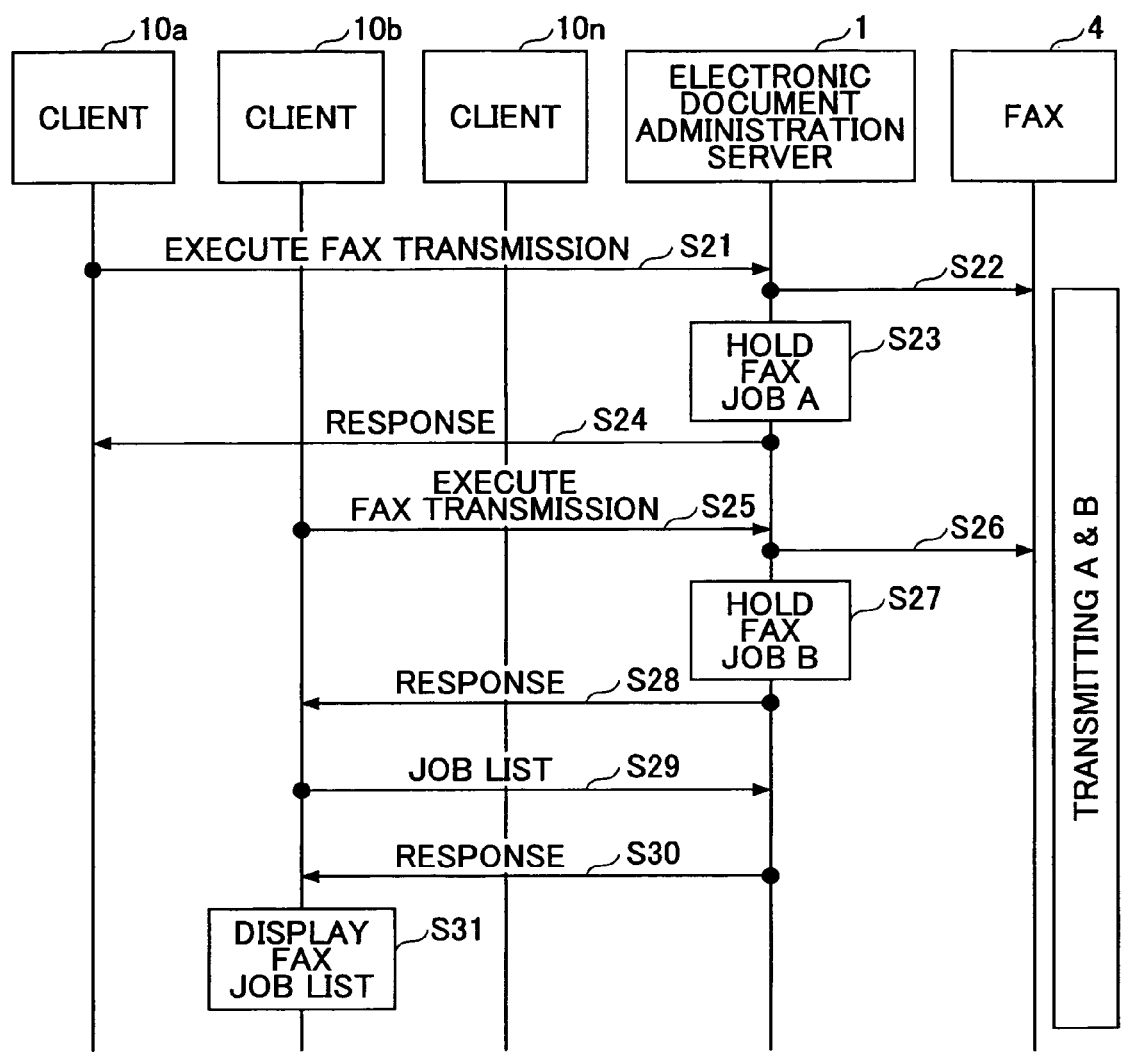
FIG. 4 is a diagram showing a facsimile transmission job acquisition sequence from the electronic document administration client.

Next, a description will be given of a facsimile transmission job sequence from the electronic document administration client, by referring to FIG. 4. FIG. 4 is a diagram showing the facsimile transmission job acquisition sequence from the electronic document administration client.

For example, the electronic document administration client 10a instructs a facsimile transmission of a document with respect to the electronic document administration server 1, as a facsimile transmission instruction from the client (step S21). The electronic document administration server 1 that receives the facsimile transmission instruction instructs the facsimile transmission of the document with respect to the facsimile apparatus 4 (step S22), holds a facsimile transmission job in a format including the user name and a facsimile number (step S23), and sends a response to the electronic document administration client 10a (step S24). For example, the facsimile transmission job is held in the format including the user name "A" and a facsimile number "03-1234-0987".

In addition, when making the facsimile transmission from the electronic document administration client 10b, the electronic document administration client 10b instructs a facsimile transmission of a document with respect to the electronic document administration server 1, as a facsimile transmission instruction from the client (step S25). The electronic document administration server 1 that receives the facsimile transmission instruction instructs the facsimile transmission of the document with respect to the facsimile apparatus 4 (step S26), holds a facsimile transmission job in the format including the user name and the facsimile number (step S27), and sends a response to the electronic document administration client 10b (step S28). For example, the facsimile transmission job is held in the format including the user name "B" and a facsimile number "03-1234-5678".

In this case, when the electronic document administration client 10b requests acquisition of a facsimile transmission job list (step S29), a facsimile transmission job list shown in FIG. 5 is displayed and output to the screen of the electronic document administration client 10b (steps S30 and S31). FIG. 5 is a diagram showing a screen display of the facsimile transmission job list in the electronic document administration client 10b.

As shown in FIG. 5, since a facsimile transmission job 21a is instructed by the electronic document administration client 10a, the user name "A" and the facsimile number "03-1234-0987", that is, a portion of the information of the facsimile transmission job 21a, is converted (masked) into a format non-recognizable by the user. On the other hand, since a facsimile transmission job 21b is instructed by the electronic document administration client 10b itself, details of the facsimile transmission job 21b are displayed in the facsimile transmission job list. The facsimile transmission job list also includes a facsimile transmission time indicating a date and time when the facsimile transmission job is executed.

With respect to the user who executes the facsimile transmission, the facsimile transmission jobs of the other users are masked, and in the above described case, the user names of the other users and the facsimile numbers to which the facsimile transmissions are being made by the other users are masked. For this reason, it is possible to provide security with respect to the facsimile transmissions of the other users.

In addition, because all of the facsimile transmission jobs are displayed in the list (or table) format, it is possible to know the order (or position) of the user's own facsimile transmission job in relation to all of the facsimile transmission jobs.

Figure 6:
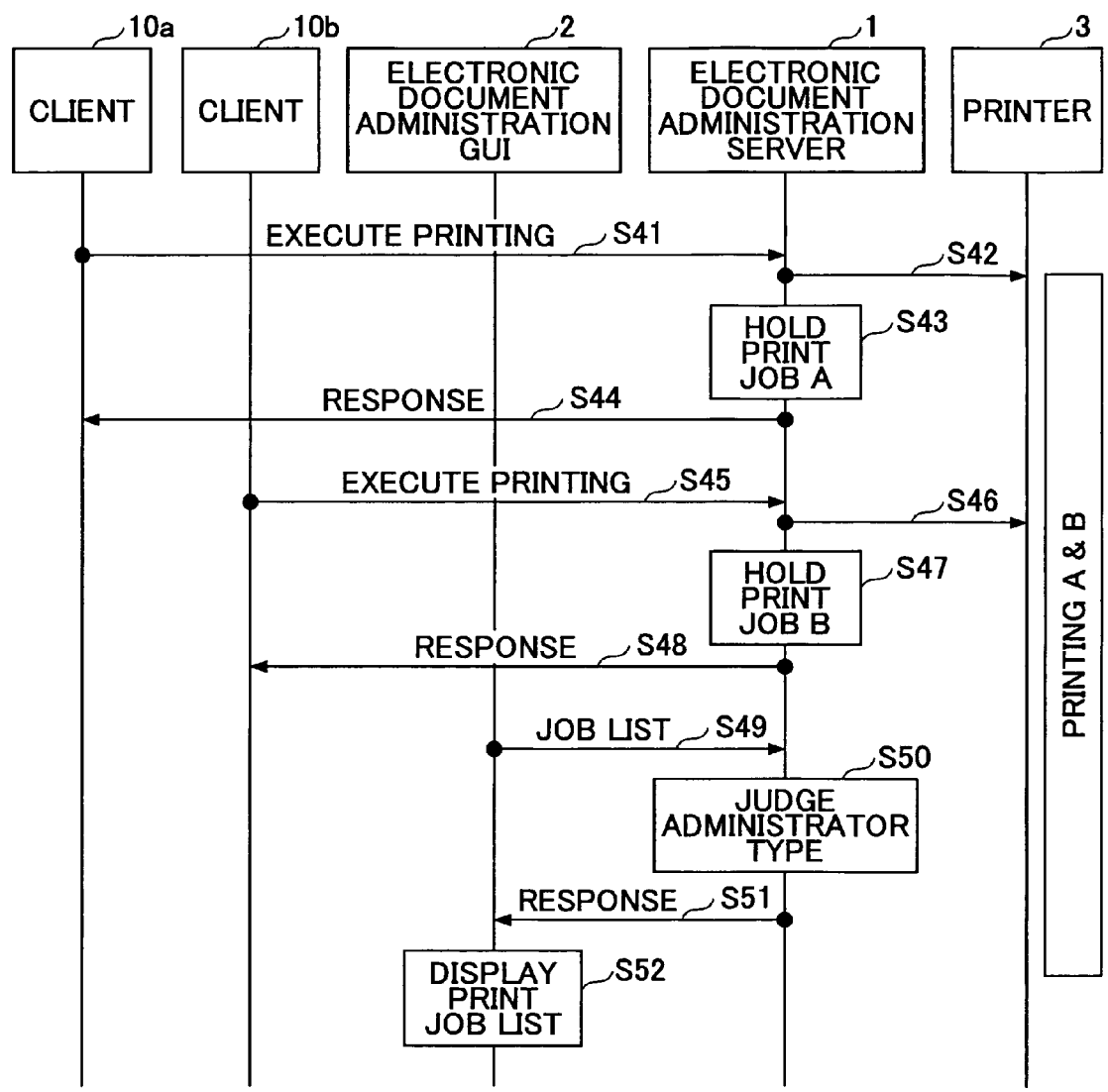
FIG. 6 is a diagram showing a print job acquisition sequence from an electronic document administration GUI.

Next, a description will be given of a print job acquisition sequence of a user of an administrator level, by referring to FIG. 6. FIG. 6 is a diagram showing the print job acquisition sequence from an electronic document administration GUI.

In FIG. 6, the sequence of instructing the execution of the printing from the electronic document administration client 10a (steps S41 through S44) and the sequence of instructing the execution of the printing from the electronic document administration client 10b (steps S45 through S48) are similar to the sequences (steps S1 through S8) shown in FIG. 2, and a description thereof will be omitted.

In this case, when the electronic document administration GUI 2 requests acquisition of a print job list (step S49), the electronic document administration server 1 judges the administrator level or type (step S50), and a print job list shown in FIG. 7 or FIG. 8 or FIG. 9 is displayed and output to the screen of the electronic document administration GUI 2 (steps S51 and S52).

FIG. 7 is a diagram showing a screen display of the print job list, without masking, in the electronic document administration GUI 2. In this case, the details of the print job are not masked, and the user name and the document name are displayed and recognizable.

FIG. 8 is a diagram showing a screen display of the print job list, with masking, in the electronic document administration GUI 2. In this case, the user name is displayed and recognizable, but the document name is masked and non-recognizable.

FIG. 9 is a diagram showing another screen display of the print job list, with masking, in the electronic document administration GUI 2. In this case, both the user name and the document name are masked and non-recognizable.

In a case where the user of the administrator level refers to the print jobs, the security may be provided by determining whether or not to mask the document name depending on the administrator level.

In a case where an absolute administrator of the system refers to the print jobs, it is unnecessary to mask the print job list. For example, in the case where a president of a company is the administrator or, in the case where a chief administrator is appointed of complete administrative responsibilities concerning the security, it is possible to refer to the print jobs of all company employees.

However, in the case of other administrators, the security can be provided by masking a portion of the data.

Figure 10:
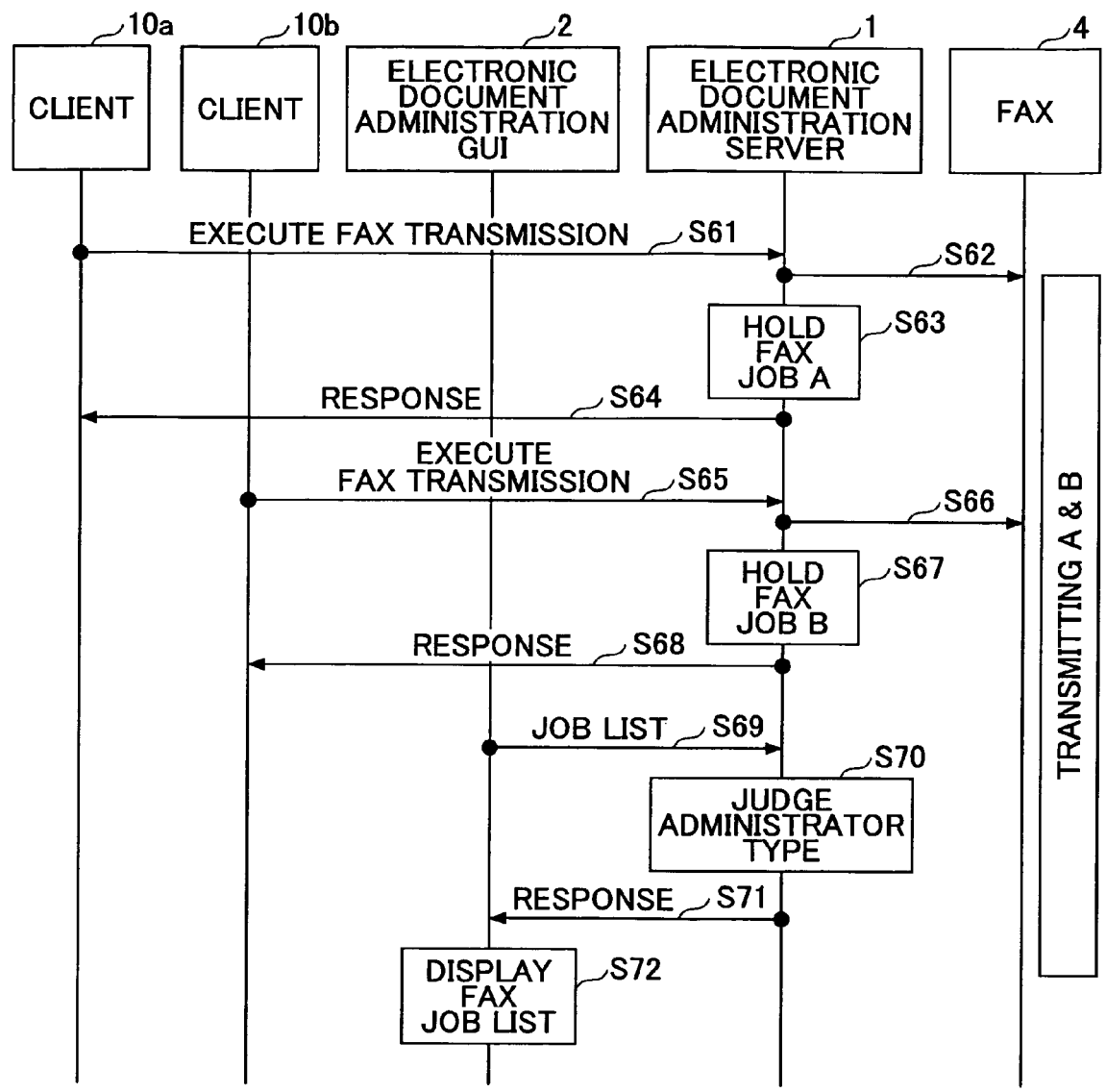
FIG. 10 is a diagram showing a facsimile transmission job acquisition sequence from the electronic document administration GUI.

Next, a description will be given of a facsimile transmission job acquisition sequence of a user of the administrator level, by referring to FIG. 10. FIG. 10 is a diagram showing the facsimile transmission job acquisition sequence from an electronic document administration GUI.

In FIG. 10, the sequence of instructing the facsimile transmission from the electronic document administration client 10a (steps S61 through S64) and the sequence of instructing the facsimile transmission from the electronic document administration client 10b (steps S65 through S68) are similar to the sequences (steps S21 through S28) shown in FIG. 4, and a description thereof will be omitted.

In this case, when the electronic document administration GUI 2 requests acquisition of a facsimile transmission job list (step S69), the electronic document administration server 1 judges the administrator level or type (step S70), and a facsimile transmission job list shown in FIG. 11 or FIG. 12 or FIG. 13 is displayed and output to the screen of the electronic document administration GUI 2 (steps S71 and S72).

FIG. 11 is a diagram showing a screen display of the facsimile transmission job list, without masking, in the electronic document administration GUI 2. In this case, the details of the facsimile transmission job are not masked, and the user name and the facsimile number are displayed and recognizable.

FIG. 12 is a diagram showing a screen display of the facsimile transmission job list, with masking, in the electronic document administration GUI 2. In this case, the user name is displayed and recognizable, but the facsimile number is masked and non-recognizable.

FIG. 13 is a diagram showing another screen display of the facsimile transmission job list, with masking, in the electronic document administration GUI 2. In this case, both the user name and the facsimile number are masked and non-recognizable.

In a case where the user of the administrator level refers to the facsimile transmission jobs, the security may be provided by determining whether or not to mask the facsimile number depending on the administrator level.

In a case where an absolute administrator of the system refers to the facsimile transmission jobs, it is unnecessary to mask the facsimile transmission job list. For example, in the case where a president of a company is the administrator or, in the case where a chief administrator is appointed of complete administrative responsibilities concerning the security, it is possible to refer to the facsimile transmission jobs of all company employees.

However, in the case of other administrators, the security can be provided by masking a portion of the data.

Next, a description will be given of a mechanism for displaying a job list by taking the security into consideration in the electronic document administration system of the present invention. In the following description, the process is described for the case where the print job is executed, but the process is similar for the facsimile transmission job.

Figure 14:
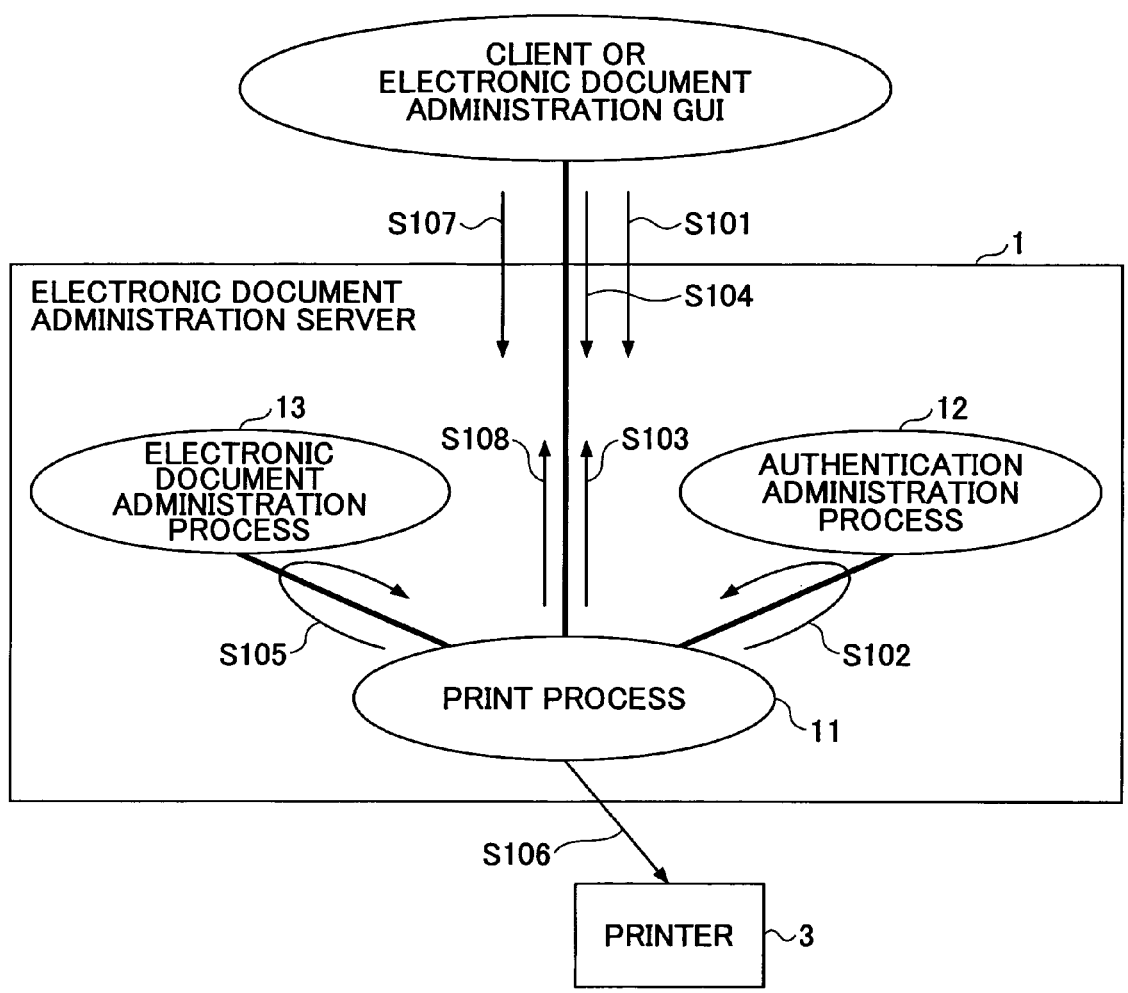
FIG. 14 is a diagram showing a process structure of an electronic document administration system.

FIG. 14 is a diagram showing a process structure of the electronic document administration system.

The electronic document administration client 10 or the electronic document administration GUI 2 makes a session establishing request with respect to a print process 1 using a ticket that has been authenticated in advance by an authentication administration process 12 of the electronic document administration server 1 (step S101).

A print process 11 of the electronic document administration server 1 confirms the validity of the ticket with respect to the authentication administration process 12 (step S102). When the validity of the ticket is confirmed, the print process 11 holds the ticket information (client name (or user name), user type (general user or manager)), and returns a session ID to the electronic document administration client 10 or the electronic document administration GUI (step S103). Thereafter, the electronic document administration client 10 or the electronic document administration GUI 2 approaches the print process 11 using the session ID.

The electronic document administration client 10 requests execution of the printing, using the session ID (step S104). The printing is not executed from the electronic document administration GUI 2.

The print process 11 pulls a document that is specified by the electronic document administration client 10 in the step S104, by an electronic document administration process 13, and enters the print job and executes the printing (step S105). The above operation is not carried out if the electronic document administration client 10 makes a direct push in the step S104.

The printer 3 executes the printing in response to the instruction from the print process 11 (step S106).

The electronic document administration client 10 or the electronic document administration GUI 2 requests acquisition of the print job list, using the session ID (step S107).

The print process 11 of the electronic document administration server 1 judges whether or not the masking is necessary, based on the user name and the user type (general user or administrator) of the electronic document administration client 10 or the electronic document administration GUI 2, and returns the print job list to the electronic document administration client 10 or the electronic document administration GUI 2 (step S108).

The creating of the print job data and the masking of the job if necessary are actually carried out by the print process 11 of the electronic document administration server 1. Next, a detailed description will be given of the processing contents of the print process 11.

Figure 15:
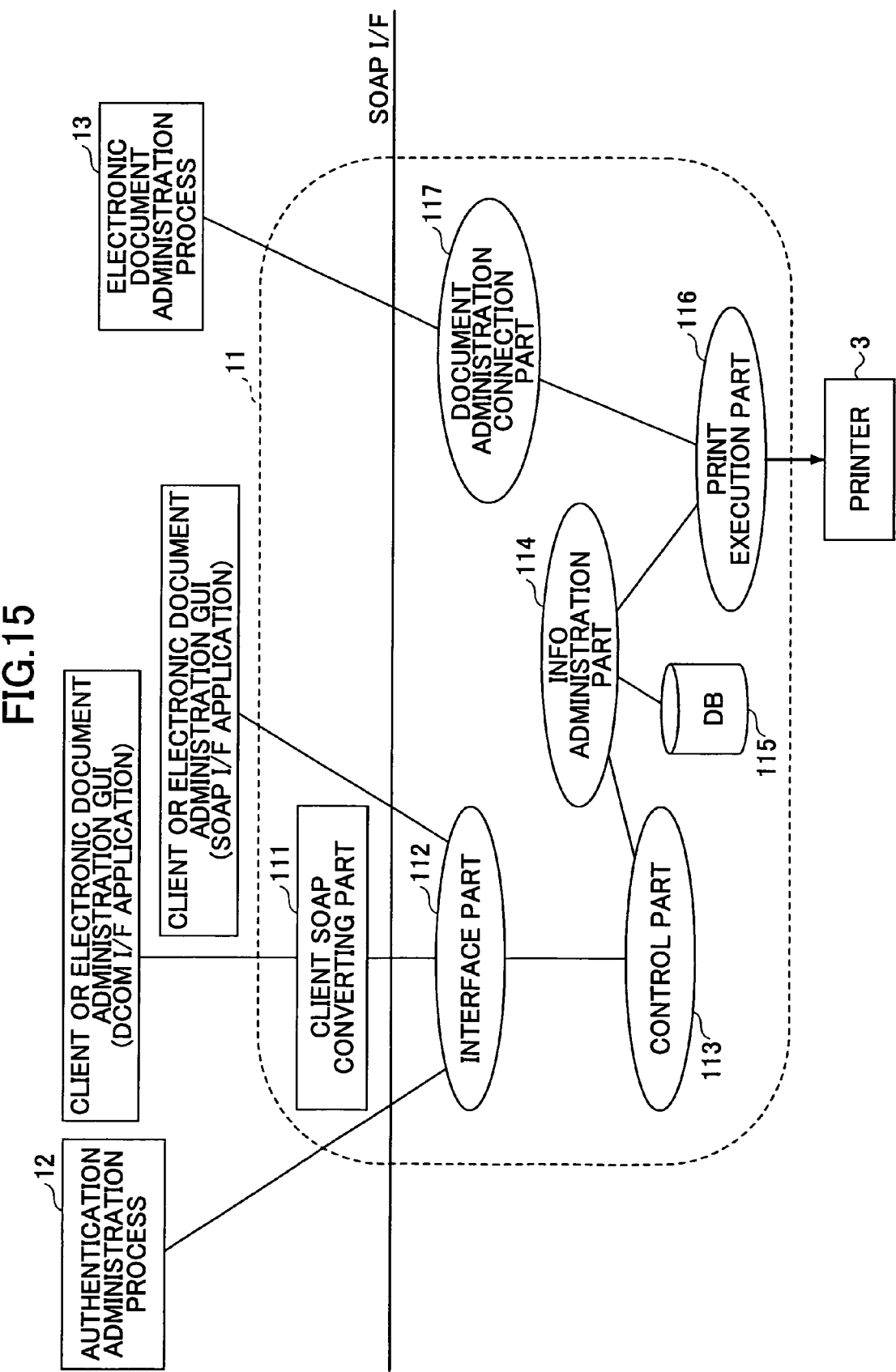
FIG. 15 is a diagram showing an internal structure of a print process of an electronic document administration server.

FIG. 15 is a diagram showing an internal structure of the print process 11 of the electronic document administration server 1.

In FIG. 15, the print process 11 of the electronic document administration server 1 is formed as a Web service. Hence, the print process 11 is provided with a client SOAP (Simple Object Access Protocol) converting part 111 for converting an exchange with a DCOM (Distributed COM) interface client into a SOAP interface, so as to be able to cope with a client application of the DCOM interface.

An interface part 112 carries out a SOAP communication (including communication via the client SOAP converting part 111), an authentication administration (session administration) and a checking by the user type.

A control part 113 carries out a control with respect to the request from the electronic document administration client 10 and the electronic document administration GUI 2, such as the inputting of the print job and the acquisition of the job list. The control part 113 also carries out a masking process with respect to the job list.

An information administration part 114 carries out administration of the print job that is input from the control part 113. In the electronic document administration system of the present invention, a database (DB) 115 is provided to carry out the administration of all of the job information. The information administration part 114 makes access to the database 115.

A print execution part 116 checks the print job that is periodically input via the information administration part 114, and if a print job to be executed exists, the print execution part 116 executes the print job. When executing a pull printing, the print execution part 116 acquires the document that is to be printed from the electronic document administration process 13 via a document administration connection part 117.

Next, a description will be given of sequences of the actual processes (data) in the print process 11 of the electronic document administration server 1, by referring to FIGS. 16 through 19.

Figure 16:
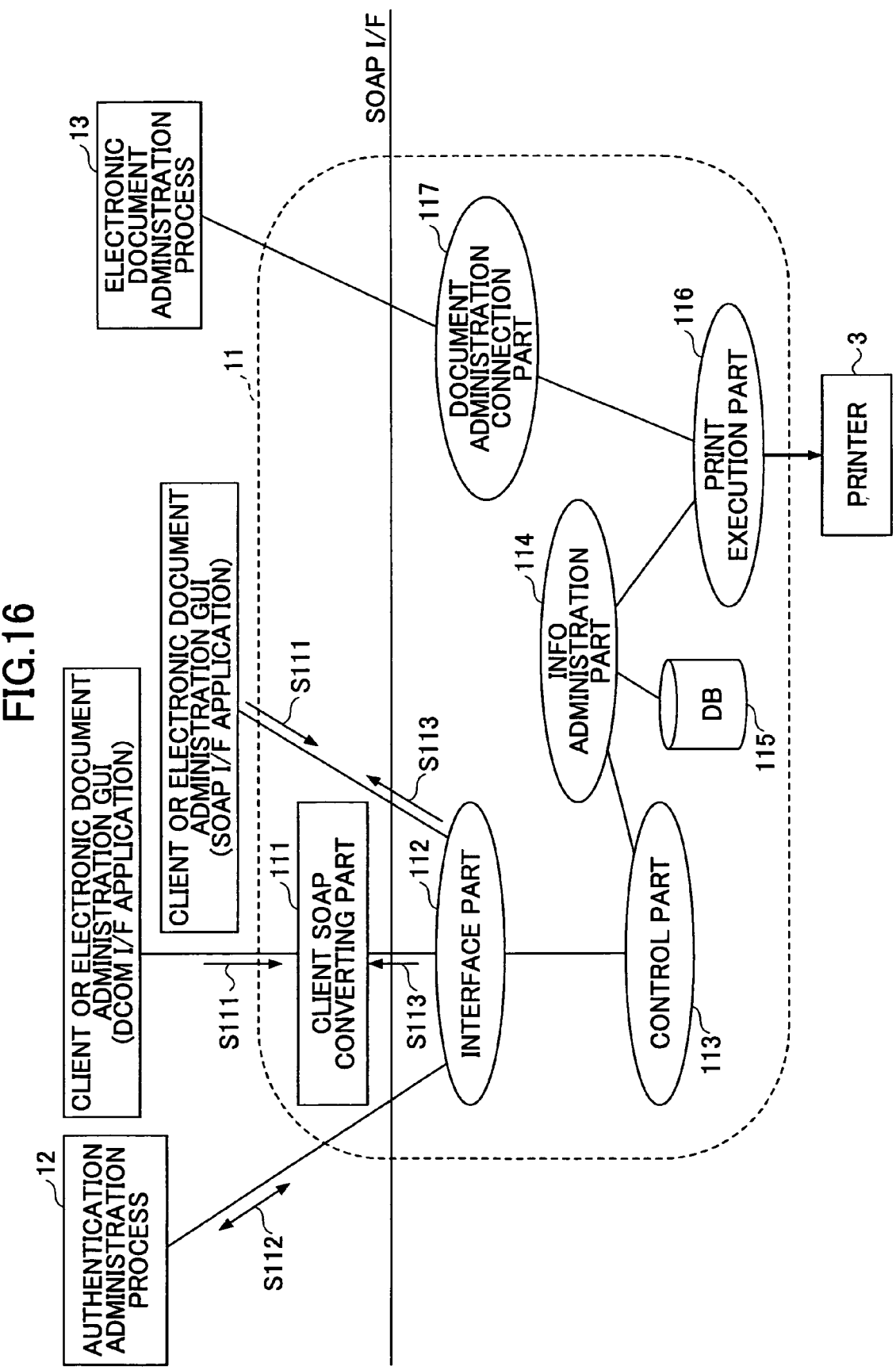
FIG. 16 is a diagram showing a sequence of establishing a session from the electronic document administration client and the electronic document administration GUI.

FIG. 16 is a diagram showing a sequence of establishing a session from the electronic document administration client 10 and the electronic document administration GUI 2.

In FIG. 16, the electronic document administration client 10 or the electronic document administration GUI 2 requests establishment of the session. In this state, the authenticated ticket acquired by the authentication administration process 12 is used as a parameter (step S111).

Then, the validity of the authenticated ticket is confirmed between the interface part 112 and the authentication administration process 12. In this state, the interface part 112 holds the client name (user name) and the user type (general user or administrator) that are included in the authenticated ticket (step S112).

If the validity of the authenticated ticket is confirmed, the session ID is returned to the electronic document administration client 10 or the electronic document administration GUI 2, and the session is established (step S113).

Thereafter, until the session is released, the session ID is used as the parameter from the electronic document administration client 10 or the electronic document administration GUI 2. As a result, it is possible to avoid unnecessary authentication process.

When confirming the validity of the authenticated ticket, the interface part 112 carries out the administration of the user name and the user type in relation to the session ID.

Figure 17:
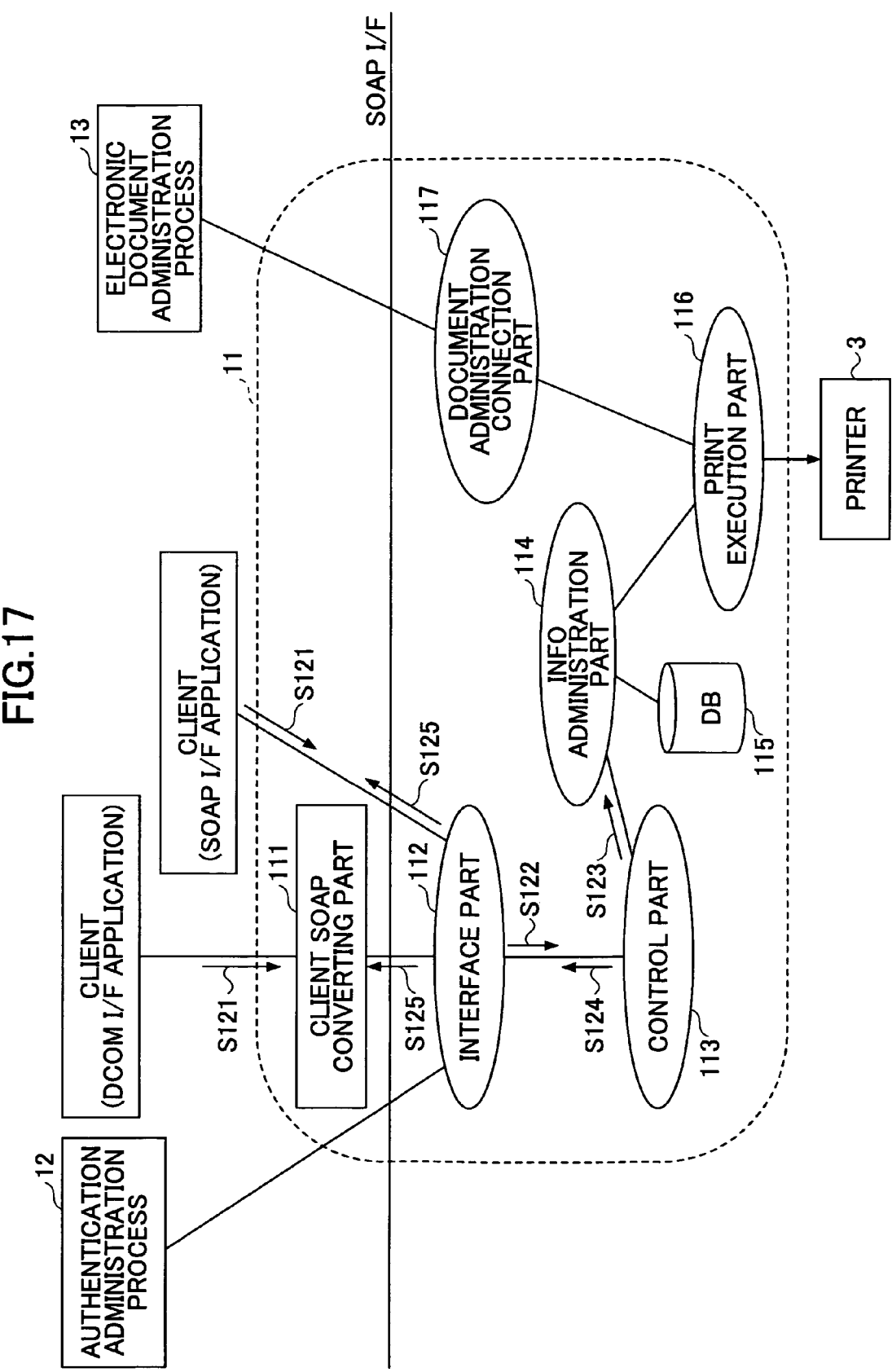
FIG. 17 is a diagram showing a sequence of inputting a print job from the electronic document administration client.

FIG. 17 is a diagram showing a sequence of inputting the print job from the electronic document administration client 10.

In FIG. 17, the electronic document administration client 10 requests execution of the printing, that is, inputting of the job (step S121). On the other hand, the interface part 112 requests inputting of the print job with respect to the control part 113 if the session ID is valid (step S122).

The control part 113 requests inputting of the print job with respect to the information administration part 114 (step S123). In this state, the information administration part 114 stores the print job in the database 115. In other words, a print wait job is created, and a job ID is created. At this point in time, if the print job is acquired from the electronic document administration client 10, the status becomes "printing wait".

The control part 113 makes a response by returning the job ID with respect to the interface part 112 (step S124). Upon receipt of the job ID, the interface part 112 makes a response by returning the job ID with respect to the electronic document administration client 10 (step S125).

Figure 18:
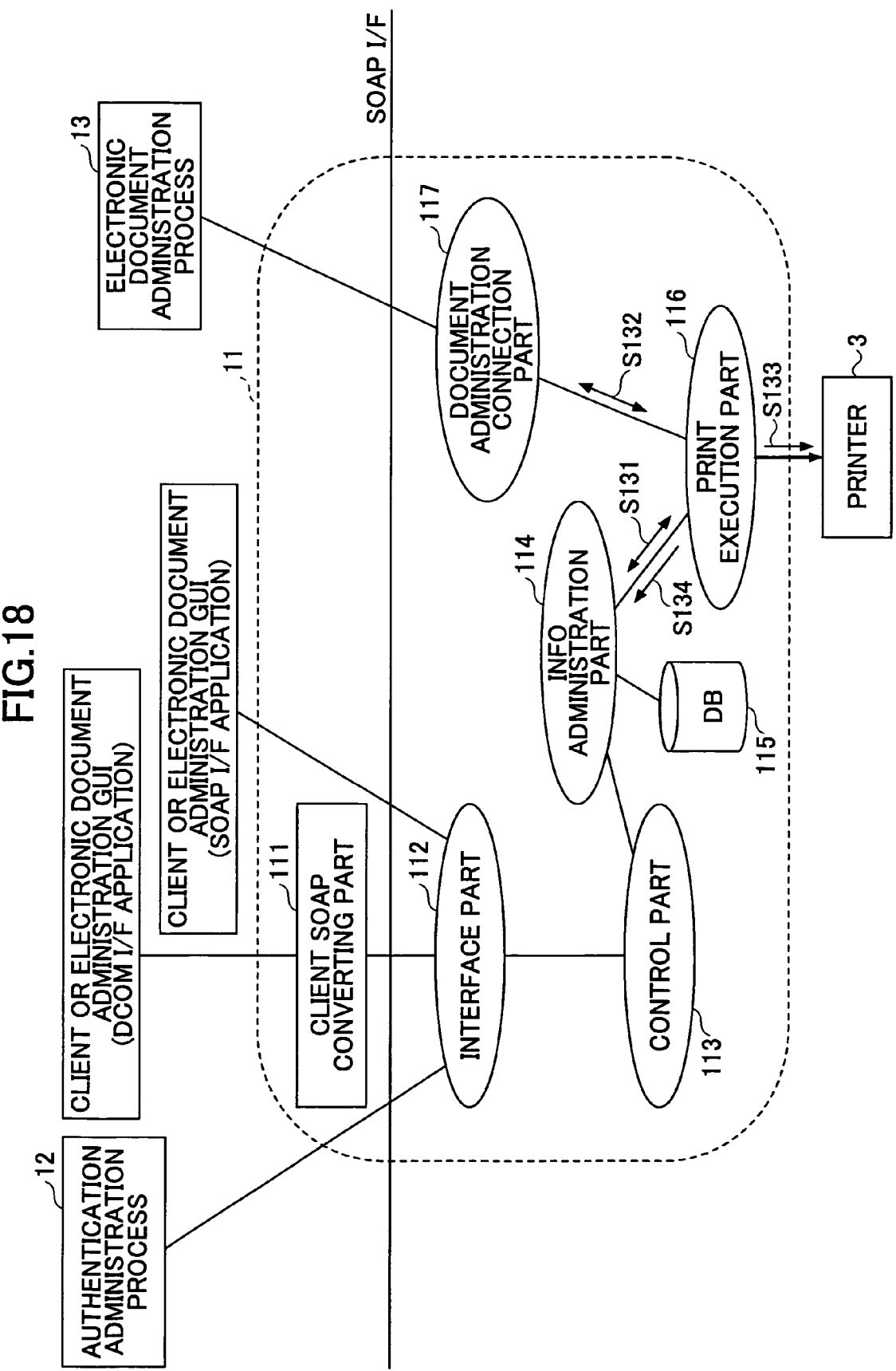
FIG. 18 is a diagram showing a sequence of executing the print job.

FIG. 18 is a diagram showing a sequence of executing the print job.

In FIG. 18, the print execution part 116 periodically acquires the print job from the information administration part 114, that is, the database 115 (step S131).

In the case of the pull printing, the print execution part 116 acquires the document that is to be printed from the electronic document administration process 13 via the document administration connection part 117 (step S132), and executes the printing (step S133).

Thereafter, the print execution part 116 stores a print result in the database 115 of the information administration part 114 step S134).

At this point in time, if the print job list is acquired from the electronic document administration client 10, the status becomes "print complete". In addition in the case of a print error, it is possible to also store details of the print error by a printer driver.

Figure 19:
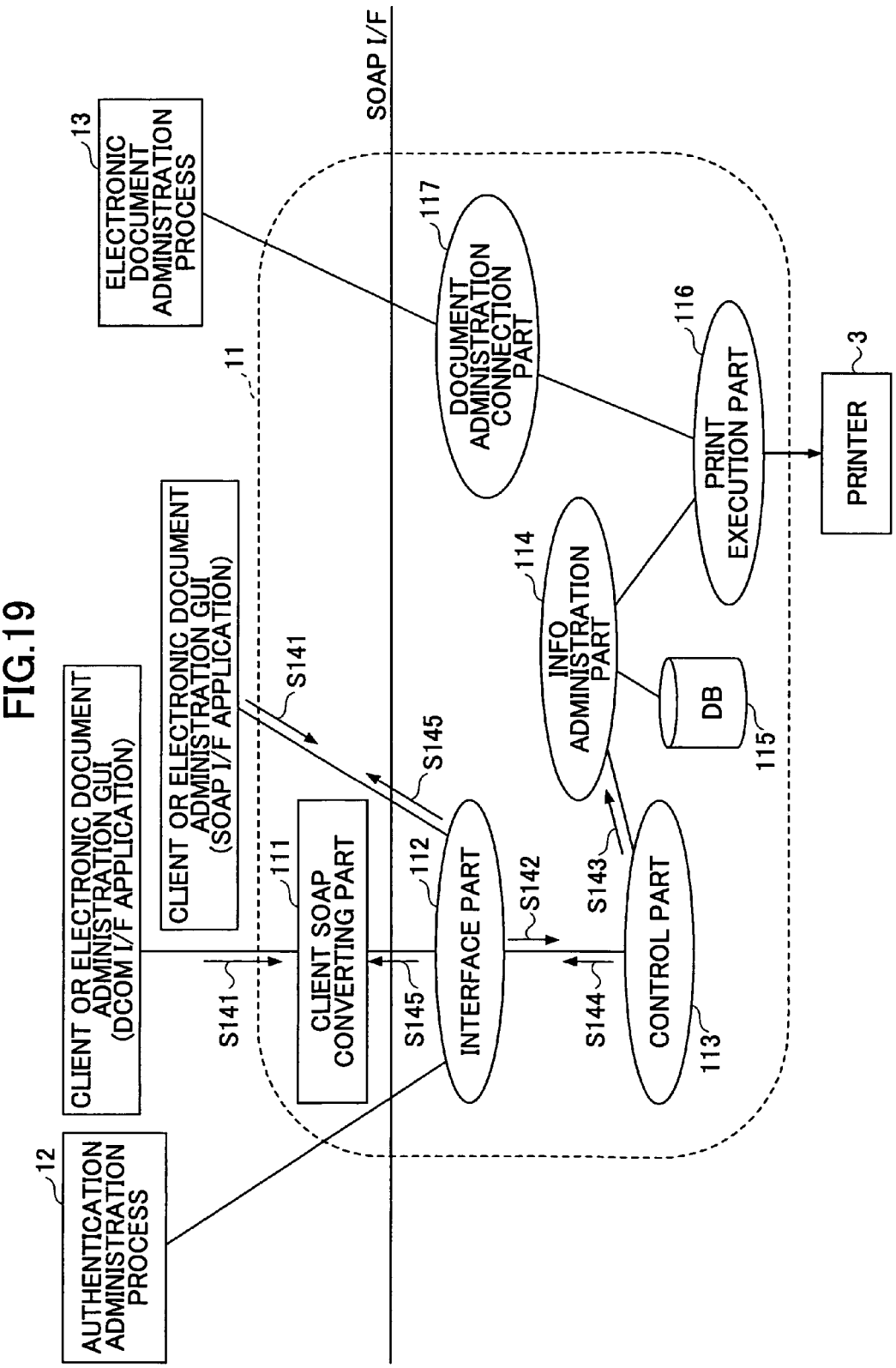
FIG. 19 is a diagram showing a sequence of acquiring the print job list from the electronic document administration client or the electronic document administration GUI.

FIG. 19 is a diagram showing a sequence of acquiring the print job list from the electronic document administration client 10 or the electronic document administration GUI 2.

In FIG. 19, the electronic document administration client 10 or the electronic document administration GUI 2 requests acquisition of the print job list (step S141). The interface part 112 checks the validity of the session ID and the user type (general user or administrator), and requests acquisition of the print job with respect to the control part 113 if no problem exists as a result of the check (step S142).

After the step S142, the control part 113 acquires a target print job from the database 115 of the information administration part 114 (step S143), carries out the masking process which will be described later, and returns the print job list to the interface part 112 (step S144). Upon receipt of the print job list, the interface part 112 returns the print job list to the electronic document administration client 10 or the electronic document administration GUI 2 (step S145).

The session ID is inserted in an argument of a job list acquisition request from the electronic document administration client 10. A judgement is made to determine whether the job list may be displayed as it is or should be masked, from the relation or correspondence of the session ID, the user name and the user type.

In order to describe the masking process and the like of the control part 113 in more detail, a description will now be given of the processes from the step S141 to the step S145, by referring to FIG. 20.

Figure 20:
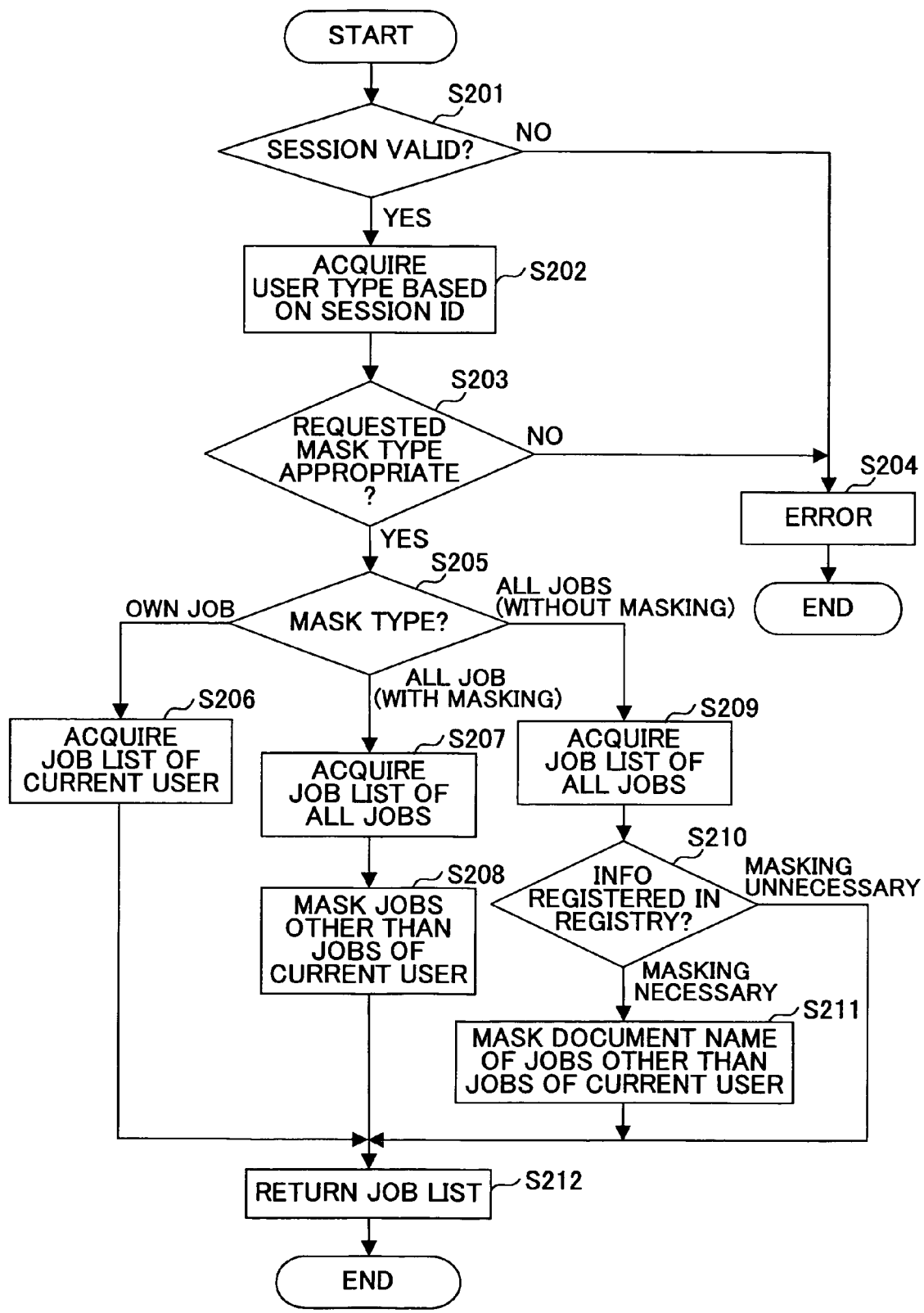
FIG. 20 is a flow chart for explaining a process of the electronic document administration server when the print job list is requested.

FIG. 20 is a flow chart for explaining the process of the electronic document administration server 1 when the print job list is requested.

In FIG. 20, the process shown in FIG. 20 is started depending on the receipt of the print job list acquisition request from the electronic document administration client 10 or the electronic document administration GUI 2 (corresponding to step S141 described above). The print job list acquisition request from the electronic document administration client 10 or the electronic document administration GUI 2 includes the session ID and a mask type as parameters. The mask type is a parameter that specifies whether or not the target print job of the acquisition request is only the user's own job or includes the jobs of other users, and whether or not the masking is to be made with respect to the print job.

First, the interface part 112 checks the validity of the session ID (step S201). If the session ID is valid, the interface part 112 acquires the user type (general user or administrator) that is related to the session ID (step S202). Then, the interface part 112 judges whether or not the mask type requested from the client (electronic document administration client 10 or electronic document administration CUI 2) is appropriate (step S203). The judgement to determine whether or not the mask type is appropriate is made based on a mask type judging table that is stored in the auxiliary storage unit 102.

FIG. 21 is a diagram showing a structure of a mask type judging table 1021. The behavior of the electronic document administration server 1 with respect to the print job acquisition request is registered for each mask type and for each user type (general user or administrator) in the mask type judging table 1021 shown in FIG. 21.

"Own job", "all jobs (with masking)" and "all jobs (without masking)" are defined with respect to the mask type. The "own job" means that the acquisition request is only for the user's own print job. The "all jobs (with masking)" means that the acquisition request is for all jobs, but that the information of the jobs other than the user's own job is masked. The "all jobs (without masking)" means that the acquisition request is for all jobs, and that the information of the jobs other than the user's own job is not masked. For the "all jobs (without masking)", it is possible to make a further detailed setting to indicate a case where only the document name is masked and all other cases (without masking).

Each job is categorized into a "completed job" and a "waiting job" depending on the state thereof. The "completed job" indicates the job for which the printing is completed, and the "waiting job" indicates the job for which the printing is in the waiting sate. The client may also specify the completed job or the waiting job, and the mask type judging table 1021 is configured by taking this into consideration.

According to the mask type judging table 1021 shown in FIG. 21, if the user type is the general user and the acquisition request is only for the user's own job, the print job list is created for both the completed job and the waiting job. In addition, when masking the jobs of the other users, the print job list is created for both the completed job and the waiting job with respect to the acquisition request for all jobs. However, when not masking the jobs of the other users, the print job list is not created with respect to the acquisition request for all jobs, and an error response is made.

On the other hand, if the user type is the administrator, the print job list is created for both mask types.

The contents of the mask type judging table 1021 are set in advance by a predetermined user such as the administrator. In addition, the contents of the mask type judging table 1021 may be appropriately modified depending on the operating state. The contents of the mask type judging table 1021 may be modified from the electronic document administration client 10 or the electronic document administration GUI 2. In this case, an exclusive screen exclusively for setting the contents of the mask type judging table 1021 is displayed on the electronic document administration client 10 or the electronic document administration GUI 2, and the interface part 112 receives the request from the exclusive screen. The contents of the mask type judging table 1021 may be modified directly from the interface part 112 or, modified from the control part 113 based on an instruction from the interface part 112.

Whether or not the mask type requested from the client is appropriate is determined depending on the user type, and if it is judged that an error response is to be made, that is, in a case indicated by a symbol "X" in the mask type judging table 1021 (NO in step S203), the error response is made with respect to the client (step S204), and the process ends.

If the mask type requested from the client is appropriate, that is, in a case indicated by a symbol "○" in the mask type judging table 1021 (YES in step S203), the process advances to a step S205 and the process depending on the mask type is executed.

In other words, when the "own job" is requested, the control part 113 extracts only the jobs of the user who made the print job list acquisition request (hereinafter referred to as "current user") from all of the jobs in the database 115 of the information administration part 114, and outputs a print job list that is formed by the extracted jobs to the interface part 112 (step S206).

On the other hand, when the "all jobs (with masking)" is requested, the control part 113 acquires all of the jobs in the database 115 of the information administration part 114, and generates a print job list that is formed by the acquired jobs (step S207). Then, the control part 113 masks the user name and the document name with respect to the jobs of the users other than the current user in the print job list, and outputs the masked print job list to the interface part 112 (step S208).

Furthermore, when the "all jobs (without masking)" is requested, the control part 113 acquires all jobs in the database 115 of the information administration part 114, and generates a print job list that is formed by the acquired jobs (step S209). Then, the control part 113 refers to a registry, and judges whether or not to mask the jobs of the users other than the current user (step S210).

In other words, information that indicates whether or not to provide the job list without the masking as requested is registered in the registry, separately from the mask type judging table 1021 shown in FIG. 21. Hence, when the "all jobs (without masking)" is requested by the administrator (user of administrator level), the control part 113 judges whether or not to mask the print job list based on the information registered in the registry.

This mechanism is provided to cope with two different concepts, one being to consider it natural for the administrator having the absolute authority (right) to be able to refer to all of the jobs (for example, the concept that considers it natural for a superior to be able to refer to the print jobs of his subordinates), and the other being to consider it inappropriate even for the administrator to refer to the jobs of other users (for example, the concept that considers it inappropriate for a subordinate who is also an administrator to refer to the print jobs of his superior).

When the information indicating that the masking is necessary is registered in the registry, the control part 113 masks the user name and the document name of the jobs of the users other than the current user in the print job list that is generated in the step S209, and outputs the masked print job list to the interface part 112 (step S211).

After the step S206 or S208 or S211, the process advances to a step S212, and the interface part 112 sends the print job list that is output from the control part 113 to the electronic document administration client 10 or the electronic document administration GUI 2.

The print jobs are described in FIGS. 14 through 21, but the process is similar for the facsimile transmission jobs. The process for the facsimile transmission jobs can be carried out similarly by replacing "print process" by "facsimile transmission process", replacing "printer" by "facsimile apparatus", replacing "print execution part" by "facsimile transmission execution part", and replacing "print job list" by "facsimile transmission job list" in FIGS. 14 through 21.

This application claims the benefit of Japanese Patent Applications No. 2004-159407 filed May 28, 2004 and No. 2005-140183 filed May 12, 2005, in the Japanese Patent Office, the disclosures of which are hereby incorporated by reference.

Further, the present invention is not limited to these embodiments, but various variations and modifications may be made without departing from the scope of the present invention.

What is claimed is:

1. A job administration apparatus for carrying out administration of job data based on an execution request for a predetermined job with respect to document data, comprising:

an acquisition request receiving part configured to receive an acquisition request for the job data, including a user type and a mask type information that indicates whether at least a portion of the job data is to be displayed in a non-recognizable format that is non-recognizable by a user;

a judgment information storage part configured to store and register information that indicates whether the job data is to be provided for each user type depending on the mask type information; and a job data providing part configured to acquire the job data depending on the acquisition request, based on the user type and the mask type information included in the acquisition request and the information registered in the judgment information storage part, when it is judged that the job data can be provided, and to send the job data acquired with a format indicated by the mask type information; and wherein the predetermined job relates to printing the document data, and the job data includes a document name of the document data, a user name of the user making a print request, and a date and time when the printing is executed; and wherein said job data providing part converts at least the document name into the non-recognizable format depending on the mask type information.

2. The job administration apparatus as claimed in claim 1, wherein: the predetermined job relates to facsimile transmission of the document data, and the job data includes a destination facsimile number, a user name of the user making a facsimile transmission request, and a date and time when the facsimile transmission is executed.

3. The job administration apparatus as claimed in claim 2, wherein said job data providing part converts at least the destination facsimile number into the non-recognizable format depending on the mask type information.

4. The job administration apparatus as claimed in claim 1, wherein: the mask type information includes information indicating whether only the job data of the predetermined job of the user making the acquisition request is to be acquired; and the judgment information storage part stores and registers the information that indicates whether the job data is to be provided depending on whether only the job data of the predetermined job of the user making the acquisition request is to be acquired.

5. The job administration apparatus as claimed in claim 4, wherein the judgment information storage part stores and registers information indicating that the job data can be provided even when at least a portion of the job data is not displayed in the non-recognizable format, when only the job data of the predetermined job of the user making the acquisition request is to be acquired.

6. The job administration apparatus as claimed in claim 1, further comprising: a storage part configured to store job data of execution requests, forming a job list, in response to the execution requests, wherein the job data providing part determines whether the job list is to be provided for the user type and the mask type information included in the acquisition request from a request source, based on the information registered in the judgment information storage part, acquires the job list from the storage part when it is determined that the job list is to be provided, and sends to the request source the job list that is acquired with the format indicated by the mask type information included in the acquisition request so that at least a portion of the job data in the job list is masked and displayed in the non-recognizable format at the request source according to the mask type information.

7. A job administration system comprising: a job request apparatus configured to make an execution request for a predetermined job with respect to document data; and the job administration apparatus of claim 1.

8. The job administration system as claimed in claim 7, wherein: the mask type information includes information indicating whether only the job data of the predetermined job of the user making the acquisition is to be acquired; and the judgment information storage part stores and registers the information that indicates whether the job data is to be provided depending on whether only the job data of the predetermined job of the user making the acquisition request is to be acquired.

9. The job administration system as claimed in claim 8, wherein the judgment information storage part stores and registers information indicating that the job data can be provided even when at least a portion of the job data is not displayed in the non-recognizable format, when only the job data of the predetermined job of the user making the acquisition request is to be acquired.

10. The job administration system as claimed in claim 7, wherein the job administration apparatus further comprises: a storage part configured to store job data of execution requests, forming a job list, in response to the execution requests, wherein the job data providing part determines whether the job list is to be provided for the user type and the mask type information included in the acquisition request from a request source, based on the information registered in the judgment information storage part, acquires the job list from the storage part when it is determined that the job list is to be provided, and sends to the request source the job list that is acquired with the format indicated by the mask type information included in the acquisition request so that at least a portion of the job data in the job list is masked and displayed in the non-recognizable format at the request source according to the mask type information, and wherein the job request apparatus is configured to generate an inappropriate execution request which contains (1) a session ID that identifies a user type for a user not authorized to request all jobs without masking and (2) a mask type information request for all jobs without masking, and wherein the acquisition request receiving part is configured to receive the inappropriate acquisition request from the job request apparatus, and the job administration system is configured to generate an error message in response to the inappropriate acquisition request.

* * * * *